US010249178B1

(12) United States Patent
Franchitti et al.

(10) Patent No.: US 10,249,178 B1
(45) Date of Patent: Apr. 2, 2019

(54) CONDITION MONITORING SENSOR SYSTEM AND METHOD FOR MONITORING THE CONDITION OF A SYSTEM

(71) Applicant: Aktiebolaget SKF, Gothenburg (SE)

(72) Inventors: Julian Franchitti, Biggar (GB); Mark Rhodes, South Queensferry (GB)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/814,520

(22) Filed: Nov. 16, 2017

(51) Int. Cl.
*G08B 29/02* (2006.01)

(52) U.S. Cl.
CPC .................................. *G08B 29/02* (2013.01)

(58) Field of Classification Search
CPC ...... G08B 29/185; G08B 29/06; G08B 25/14; G08B 29/16; G08B 29/08; G08B 29/18; G08B 29/00; G08B 29/02; G01R 17/00; G01R 17/10; G01R 17/12
USPC ........................................................ 340/506
See application file for complete search history.

(56) References Cited

U.S. PATENT DOCUMENTS

| 6,145,103 | A * | 11/2000 | Typaldos | G06F 11/3648 703/28 |
| 8,756,446 | B2 * | 6/2014 | Rancurel | G06F 1/3203 713/323 |
| 9,031,733 | B1 * | 5/2015 | Licis | G06F 19/00 701/29.2 |
| 9,398,535 | B2 * | 7/2016 | Sugitani | H04W 52/0241 |
| 2006/0100002 | A1 * | 5/2006 | Luebke | G06F 3/0362 455/574 |
| 2006/0251115 | A1 * | 11/2006 | Haque | H04B 7/2606 370/466 |
| 2008/0047363 | A1 * | 2/2008 | Arms | B60C 23/0411 73/862 |
| 2010/0308967 | A1 * | 12/2010 | Lauronen | H04L 1/188 340/10.1 |
| 2011/0179297 | A1 * | 7/2011 | Simmons | G06F 1/325 713/323 |
| 2015/0130637 | A1 * | 5/2015 | Sengstaken, Jr. | G08C 17/02 340/870.16 |
| 2015/0293579 | A1 * | 10/2015 | Petrovic | G06F 1/3287 713/323 |
| 2016/0132097 | A1 * | 5/2016 | Gainey | G06F 1/32 713/323 |

(Continued)

*Primary Examiner* — Hirdepal Singh
(74) *Attorney, Agent, or Firm* — Bryan Peckjian; SKF USA Inc. Patent Dept.

(57) ABSTRACT

A condition monitoring sensor system having a power supply; a condition monitoring sensor; a processor; a permanently powered power-on timer; and a watchdog timer. The permanently powered power-on timer is set for a first predetermined duration and is configured to wake the processor by connecting the processor to the power supply if the power-on timer elapses. Upon waking up, the processor is configured to reset the power-on timer to the first predetermined duration and is configured to control at least the condition monitoring sensor. The condition monitoring sensor may take condition monitoring data. Upon waking up, the processor is configured to set the watchdog timer for a second predetermined duration. The watchdog timer is powered via the power supply, which forces the processor and the watchdog timer to enter a sleep mode by disconnecting the processor and the watchdog timer from the power supply if the watchdog timer elapses.

10 Claims, 3 Drawing Sheets

(56) References Cited

U.S. PATENT DOCUMENTS

| | | | |
|---|---|---|---|
| 2016/0378168 A1* | 12/2016 | Branover | G06F 1/3287 |
| | | | 713/323 |
| 2017/0088072 A1* | 3/2017 | Curtis | G08B 21/182 |
| 2017/0199101 A1* | 7/2017 | Franchitti | B61K 9/00 |
| 2018/0032391 A1* | 2/2018 | Furuya | G06F 1/24 |
| 2018/0122235 A1* | 5/2018 | Hanks | H04W 4/046 |
| 2018/0286213 A1* | 10/2018 | Schueler | H04W 52/0216 |

* cited by examiner

CONDITION MONITORING SENSOR SYSTEM AND METHOD FOR MONITORING THE CONDITION OF A SYSTEM

TECHNOLOGICAL FIELD

The present disclosure relates to condition monitoring devices, and, in particular, to condition monitoring sensor systems and a method for monitoring the condition of a system.

BACKGROUND

Condition monitoring systems allow for the monitoring of the condition of a system without the need for manual inspection. These systems can be especially important in remote areas or areas which are difficult or dangerous to access, such as the axles and/or bearings of a railway system, particularly one in active operation. In these situations, remote wireless condition monitoring systems can be used.

A remote wireless condition monitoring system may be powered by a battery pack or limited capability power source such as a harvester. A consideration in the design of wireless condition monitoring systems is the time between maintenance which is frequently dictated by the life of their batteries. As a consequence, power management is an important factor in the design of wireless condition monitoring systems because it has immediate impact on maintenance intervals. In these systems, the sensor usually operates from a repetitive cyclic schedule stored in internal memory.

Some wireless condition monitoring systems may rely on external third party systems (such as cellular or wireless networks) to allow them to perform core functions such as data transmission and/or reception. Such external third party systems have the potential to cause the wireless condition monitoring system to behave in an unintended or unpredictable manner. The condition monitoring system may fail to power-on or wake as needed due to events such as loading of a bad firmware image, an incorrect wake schedule which sets an internal real time clock of the condition monitoring system to wake a processor too far in the future or an error encountered during an over-the-air firmware update. The condition monitoring system may fail to power-off or sleep if the processor hangs or an external influence (such as the cellular network or other third party system) causes the condition monitoring system to behave in an unpredictable manner.

Typically, if a device in the field fails to recover due to a firmware or software error, power cycling the sensor or reprogramming the processor with an updated image recovers it from an unknown state. In some cases, a housing containing the system electronics is permanently sealed; there is no ability to power cycle the condition monitoring system or reprogram it using a wired method.

Therefore, solutions preventing the condition monitoring system from behaving in such an unintended or unpredictable manner are desired.

SUMMARY

Embodiments of the present disclosure relate to condition monitoring devices, and, in particular, to condition monitoring sensor systems and a method for monitoring the condition of a system.

According to a first aspect of the present disclosure, a condition monitoring sensor system is provided. The condition monitoring system comprises a power supply; a condition monitoring sensor; a processor; a permanently powered power-on timer; and a watchdog timer. The permanently powered power-on timer is set for a first predetermined duration. The permanently powered power-on timer is configured to wake the processor by connecting the processor to the power supply if the power-on timer elapses. Upon waking up, the processor is configured to reset the power-on timer to the first predetermined duration. Upon waking up, the processor is configured to control at least the condition monitoring sensor. The condition monitoring sensor may take condition monitoring data. Upon waking up, the processor is configured to set the watchdog timer for a second predetermined duration. The watchdog timer may be powered via the power supply. The watchdog timer may force the processor and the watchdog timer to enter a sleep mode by disconnecting the processor and the watchdog timer from the power supply if the watchdog timer elapses.

In some examples, the condition monitoring sensor system may further comprise a permanently powered real time clock. The permanently powered real time clock may be configured to wake the processor by connecting the processor to the power supply based on a predetermined schedule.

In some examples, the processor may be configured to update or reset the processor's configuration if the power-on timer wakes the processor.

In some examples, the watchdog timer, while powered, may be configured to override other circuit components when disconnecting the processor from the power supply.

In some examples, the condition monitoring sensor system may further comprise a switch coupled between the power supply and the processor. During the processor's sleep mode, the switch may be controlled by the real time clock or the power-on timer to enter the processor's wake mode. During the processor's wake mode, the switch may be controlled by the processor or the watchdog timer to enter the processor's sleep mode.

In some examples, the switch may comprise a field effect transistor, FET.

In some examples, the condition monitoring sensor system may further comprise one or more antennas and/or transceiver circuitry. The transceiver circuitry may be coupled to the one or more antennas. The transceiver circuitry may be configured to transmit condition monitoring data from the condition monitoring sensor to a remote device.

According to a further aspect of the present disclosure, a method for monitoring the condition of a system is provided. The method comprises setting an independently powered power-on timer for a first predetermined duration; waking the processor from sleep mode if the power-on timer has elapsed; resetting the power-on timer to the first predetermined duration when the processor wakes; setting a watchdog timer for a second predetermined duration when the processor wakes; taking or transmitting condition monitoring data when the processor is in wake mode; and forcing the processor and watchdog timer into sleep mode if the watchdog timer elapses.

In some examples, the method may further comprise waking the processor from sleep mode based on a predetermined schedule.

In some examples, the method may further comprise updating or resetting the configuration of the processor if the power-on timer wakes the processor.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Figure 1:
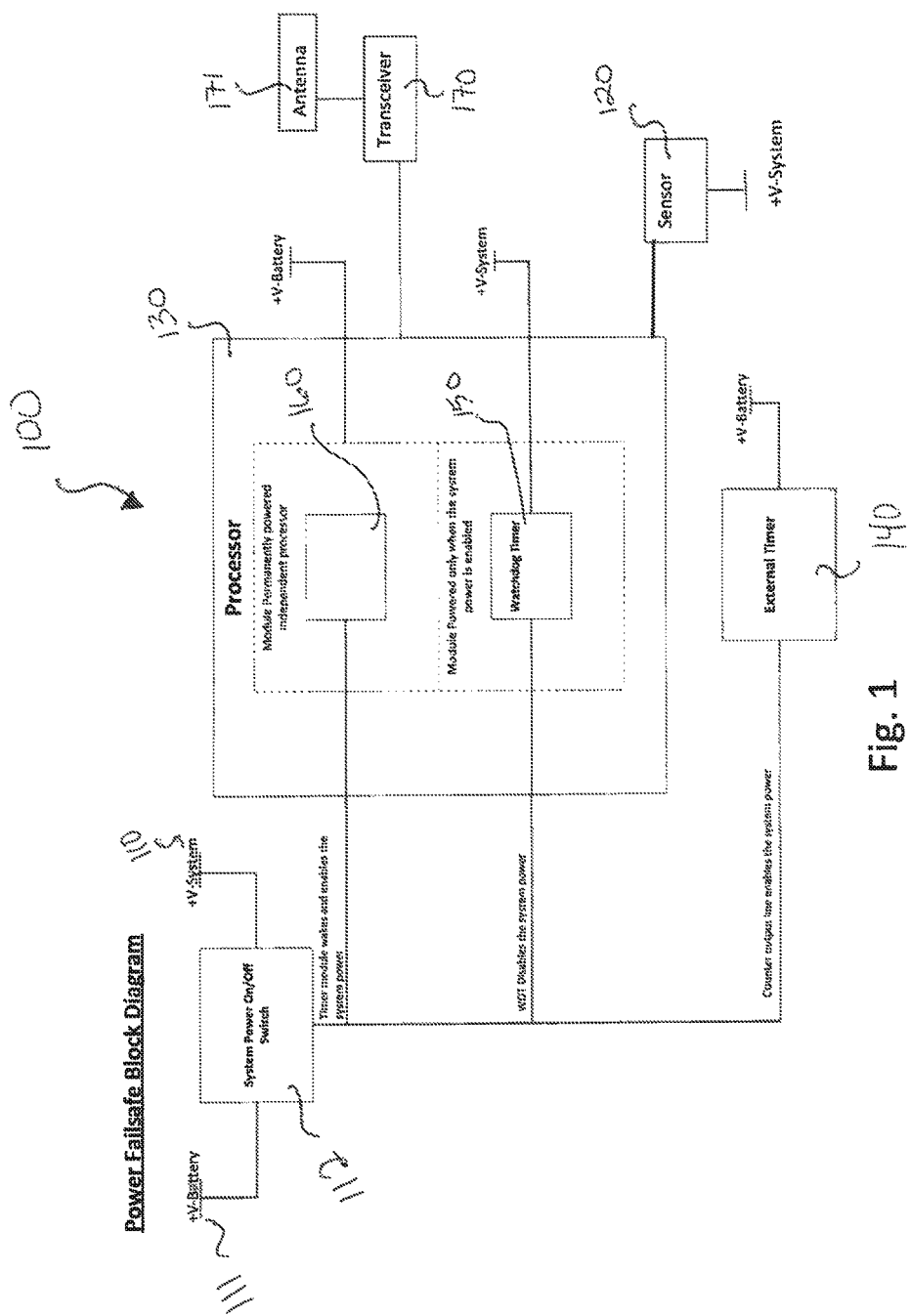
FIG. 1 shows a block diagram of a condition monitoring sensor system.

FIG. 1 shows a block diagram of a condition monitoring system 100. The condition monitoring system 100 comprises power supply (V-System) 110, condition monitoring sensor 120, processor 130, power-on timer 140, and watchdog timer 150. The system 100 may further comprise a real time clock (RTC) 160, which acts as a primary wake-up source for the example shown in FIG. 1.

Power supply 110 is connected to the various system components by a system power switch 112. The power supply 110 may be a limited power source (such as a battery or harvester) or it may be connected to a substantially larger power source (such as of the device who's condition is to be monitored). The system power switch 112 may comprise any type of mechanical or semiconductor switch, such as a relay, BJT, MOSFET, IGBT, etc. For example, the switch may be a p-channel field effect transistor.

The system power switch 112 has multiple power enable and disable sources, and enables power to the processor 130 and peripherals (such as sensor 120 or watchdog timer 150). However, the system power switch 112 does not control the power to the power-on timer 140 or RTC 160. A separate power source, a battery (V-Battery) 111, provides power to the power-on timer 140 and RTC 160 even when the system power switch 112 is turned off or primary system power is otherwise disabled. In this context, the battery permanently powers the power-on timer 140 and RTC 160. Although a battery is used in the example of FIG. 1, any power source may be used as long as it continues to provide power to the power-on timer 140 and the RTC 160 even with the system power turned off.

When the power supply 110 is enabled (i.e. switch 112 is turned on), the system 100 is in a high-energy "wake" mode during which condition monitoring data is taken and/or transmitted. Once the power supply 110 is disabled (i.e. system power switch 112 is turned off), the system 100 reverts to a low-energy "sleep" mode.

The system power switch 112 is coupled between the power supply 110 and the processor 130. During the processor's sleep mode, the switch 112 is controlled by at least the power-on timer 140 and/or the RTC 160. During the processor's wake mode, the switch 112 is controlled by at least the processor 130 and/or the watchdog timer 150. In some examples, additional system components may be configured to control the switch. For example, the system 100 may be optionally equipped with a magnetic switch which can be used to manually toggle the power switch 112. It should be appreciated that, although a simple switch configuration is shown in connection with the example of FIG. 1, numerous alternatives may be implemented in connecting the various circuit components to the system power supply 110.

Primary power-on functionality is provided by a primary wake-up source. The primary wake-up source is independently powered and configured to wake the processor from sleep mode based on a predetermined schedule. In the example of FIG. 1, the processor 130 is woken from sleep mode by primary wake-up source RTC 160, which resides in the processor 130 but is an independent module from a power and functionality perspective. It should be appreciated that, although an RTC module is illustrated in reference to the provided examples, any independent source (from a power and functionality perspective) may provide the primary wake-up signal.

The RTC 160 may be configured to wake the processor 130 based on a predetermined schedule. The predetermined schedule may be based on any factors relevant to the condition to be monitored. For example, the predetermined schedule may be based on a time (such as every 2 hours, every day at 12:00, etc.), a known route or path (such as during a straight segment of travel along a known route), a status of the condition to be monitored (such as the unit to be monitored being in operation or not), or any other criteria or combination of criteria affecting the condition to be monitored.

If the condition monitoring system 100 is in sleep mode, it is normally awoken by the RTC 160 in order to perform functions such as bearing monitoring or data transmission (i.e. taking or transmitting condition monitoring data). A power-on failsafe is provided if the RTC 160 fails to instigate system power up according to the predetermined schedule. This ensures that if an unforeseen error is encountered that disrupts the standard wake-up procedure, the system 100 recovers. Thus, the power-on failsafe ensures recovery if the sensor system fails to power on via its primary wake-up source.

Secondary power-up functionality is provided by a permanently powered external counter (power-on timer 140). As previously explained, the power-on timer 140 is permanently powered by a system battery (V-Battery) 111. Thus, even if the system power switch 112 is turned "off", the power-on timer 140 will remain powered.

After the processor 130 wakes (by any means), the processor 130 immediately configures a secondary independent wake up mechanism, power-on timer 140, with hardware interrupt connected to the master power switch 112, to wake the system after a first predetermined duration should the primary wake up source (i.e. RTC 160) fail to fire again within this period.

The power-on timer 140 is set for a first predetermined duration. The first predetermined duration may be chosen to be long enough to allow for the primary power on source to operate based on known conditions (such as the predetermined schedule), but short enough to guarantee that the system 100 has a maximum downtime if the primary power-on fails. For example, the first predetermined duration may be set for 24 hours.

If the power-on timer 140 elapses without being reset, then the power-on timer 140 wakes the processor 130 by connecting the processor 130 to the power supply 110 (by turning on the system power switch 112). Thus, if the processor 130 fails to wake by its primary power-on source, then the power-on timer 140 will act as a secondary power-on source and force the processor 130 to awaken. Alternatively, if no primary power-on source is provided, the power-on timer 140 will wake the system based on the first predetermined duration.

Additionally, or alternatively, if the power-on timer 140 wakes the processor 130, then the primary power-on source has failed to trigger. This may be due to a faulty or erroneous wake-up schedule. Thus, if the power-on timer 140 wakes the processor 130, then the processor 130 may be configured to update or reset its configuration (i.e. update or reset the predetermined schedule). In this way, a correct wake-up schedule can be obtained.

Upon waking up, the processor 130 will reset the power-on timer 140 to the first predetermined duration. As long as the processor 130 wakes before the first predetermined duration has elapsed, then the power-on timer 140 will be reset and the system will function normally (i.e. the power-on timer 140 will not wake the system since the power-on timer 140 will be reset and never elapse).

While the system is in wake mode, the processor 130 may control the condition monitoring sensor 120 to take condition monitoring data. The sensor 120 may comprise a vibration sensor, a motion sensor, a pressure sensor, or any type of sensor which is capable of monitoring a desired condition. The sensor 120 may be configured to take condition monitoring data based on known positions in the field, a cyclical time schedule, or any other criteria relevant to the condition to be monitored. For example, when monitoring railway bearings, it may be beneficial to take condition monitoring data during straight stretches of railway which are minimally influenced by noise or other factors.

In contrast to RTC 160 and power-on timer 140, the processor 130 and the watchdog timer 150 are powered by the power supply 110. Thus, they are only powered when the system power switch 112 is "on"; enabling the power supply 110. The power-on timer 140 and RTC 160 do not switch to sleep mode, but instead remain powered by battery 111.

Primary power off functionality is provided by the processor IO. Due to the limited power available, under normal operation, the processor performs its intended functions and switches itself and peripheral circuitry into sleep mode via the system power switch 112 via one of its IO pins which connects to a system power transistor, thus disabling the power to the majority of the system.

Normally, after the processor 130 has finished completing its tasks, it switches the system to idle sleep mode to protect the energy source from being drained. A power off failsafe is provided to ensure that the system switches off if an unforeseen event disrupts the normal power down mechanism. This ensures that the sensor is not unnecessarily held in active mode draining power. Thus, the power-off failsafe ensures recovery if the system fails to power off via its primary power-off method and places a cap on energy usage by limiting the active time. A processor independent watchdog timer acts as a secondary power off source.

Upon each wake from sleep mode, the processor 130 sets the watchdog timer 150 for a second predetermined duration (such as 10 minutes). The watchdog timer 150 is reset to the second predetermined duration and starts running at each power-on wake event. The second predetermined duration may be chosen to be long enough to allow the processor 130 to complete any actions it needs to by a sufficient margin of error (such as 5×, 10×, or 100× the average time needed to take or transmit condition monitoring data), but short enough to guarantee that the system 100 has a maximum wake time if it has been active for a prolonged period to protect it from "hanging" or being stuck in a state it can't recover from. The watchdog timer 150 is set to independently withdraw power if it stays on for longer than a second predetermined duration.

If the system hangs or spends too much time in active mode, the watchdog timer 150 expires, causing the system power switch 112 to de-activate, forcing the system to enter sleep mode. If the watchdog timer 150 elapses without being reset, then the watchdog timer 150 forces the processor 130 (and watchdog timer 150) into sleep mode by disconnecting the processor 130 (and watchdog timer 150) from the power supply 110 (by turning off the system power switch 112). Thus, if the processor 130 fails to sleep by its primary power-off source (i.e. the processor 130 itself), then the watchdog timer 150 will act as a secondary power-off source and force the processor 130 to sleep.

The first predetermined duration influences the power-on timer 140 and controls the maximum duration during which the system may be off or in sleep mode. In contrast, the second predetermined duration influences the watchdog timer 150 and controls the maximum duration during which the system may be on or in wake mode.

If the watchdog timer 150 is unable to override the other circuit components, then it may be unable to turn off system power even when its timer has elapsed. Thus, additionally or alternatively, the watchdog timer 150 may be configured to override other circuit components when disconnecting the processor 130 from the power supply 110. In this sense, the watchdog timer 150 should be able to turn off the system power switch 112 even if other system peripherals wish to keep it on.

Additionally, or alternatively, the system 100 may further comprise a transceiver 170 and/or one or more antennas 171. The transceiver 170 and antenna(s) 171 may be integrated into the condition monitoring system 100 itself or they may be provided by external third party systems coupled to the condition monitoring system 100. Thus, the system 100 may be configured to transmit condition monitoring data from the condition monitoring sensor 120 to a remote device.

Using these mechanisms should reduce the chance of a sensor system hanging in the field and becoming unrecoverable due to a spurious event or firmware bug.

Figure 2:
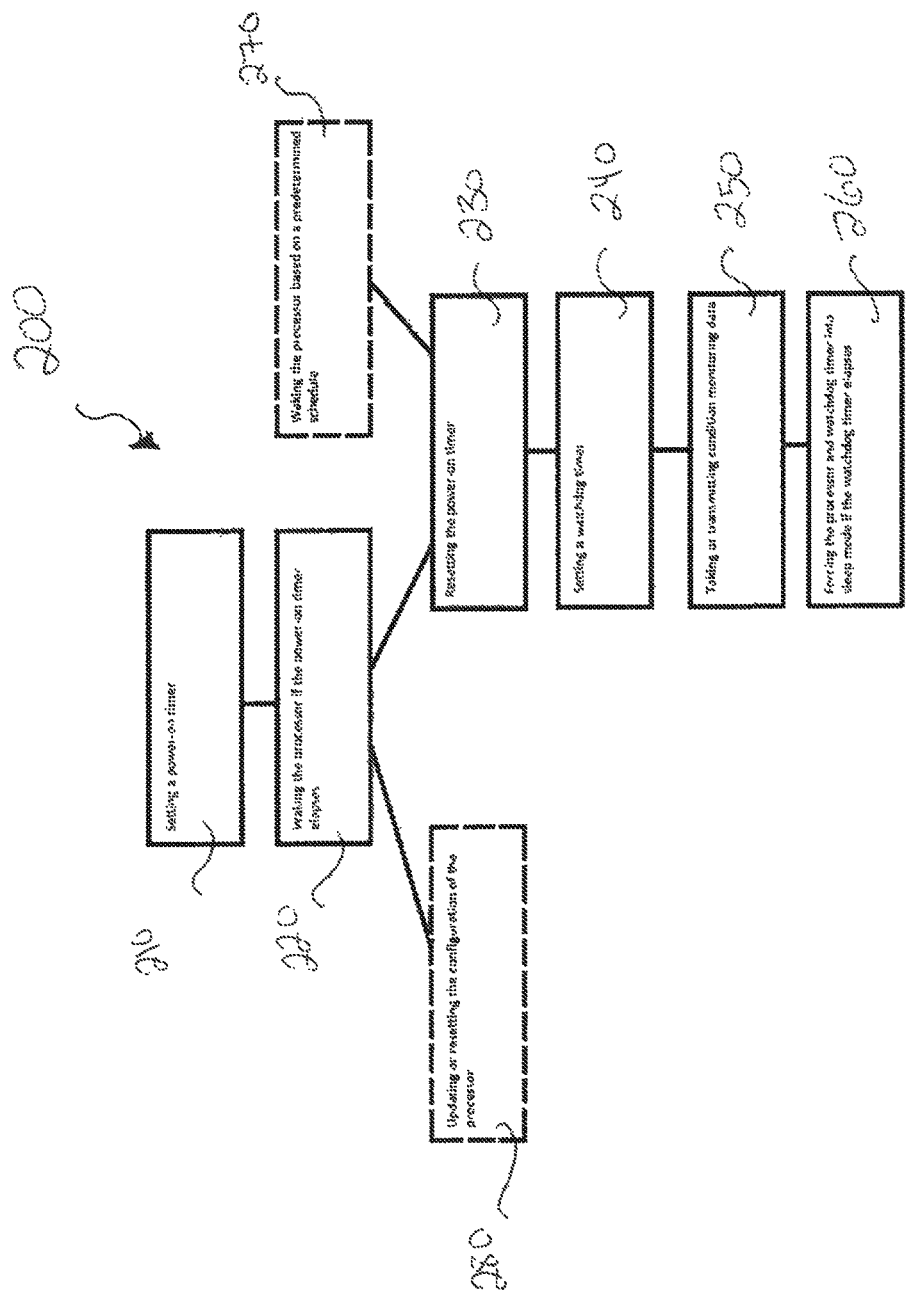
FIG. 2 shows a flow chart of a method for monitoring the condition of a system.

FIG. 2 shows a flow chart of a method 200 for monitoring the condition of a system. The method 200 comprises 210 setting an independently powered power-on timer for a first predetermined duration; 220 waking the processor from sleep mode if the power-on timer has elapsed; 230 resetting the power-on timer to the first predetermined duration when the processor wakes; 240 setting a watchdog timer for a second predetermined duration when the processor wakes; 250 taking or transmitting condition monitoring data when the processor is in wake mode; and 260 forcing the processor and watchdog timer into sleep mode if the watchdog timer elapses.

In some examples, the method 200 may include 270 waking the processor based on a predetermined schedule (i.e. by a primary power-on source; not by the power-on timer). In the example shown in FIG. 1, this would correspond to waking the system by means of the RTC.

In some examples, the method 200 may include 280 updating or resetting the configuration of the processor if the power-on timer wakes the processor (i.e. if the secondary power-on source wakes the processor). For example, if the primary power-on schedule is corrupt, causing the secondary power-on source to trigger, then the primary power-on schedule would be updated or reset.

Figure 3:
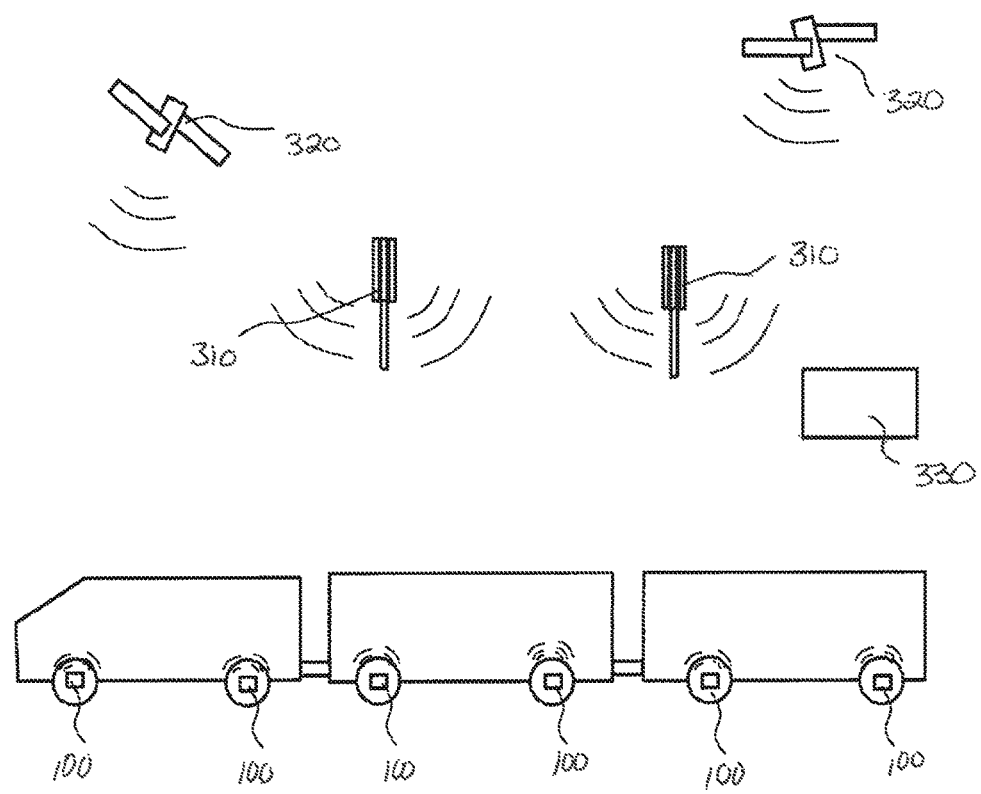
FIG. 3 shows an embodiment of a condition monitoring system.

FIG. 3 shows an embodiment of the condition monitoring system 100 in the context of railway bearing monitoring. The condition monitoring system 100 is installed to monitor the condition of railcar bearings while in operation. Remote wireless monitoring is highly desired in this context because of limited space and the danger of moving components while the railcar is in operation.

Since the route of railcars is generally known, it is possible to establish a predetermined schedule so as to obtain condition monitoring data during opportune times. For example, one could set the predetermined schedule to wake the processor and take condition monitoring data during times of straight travel along a known route (thus minimizing noise and other influences).

In order to transmit the data to a remote device, some form of reception antenna is required. Receiving antennas may be installed in train stations such that the data may be transmitted when the railcar pulls into the station, but this limits the transmission capability to the stations only. Alternatively, one may rely on external third party networks, such as cellular towers, to transmit the data while in the field (i.e. while travelling between stations) since cell towers are generally available.

FIG. 3 shows condition monitoring system(s) 100 installed on the bearings of a railcar. The condition monitoring system 100 takes condition monitoring data which is then transmitted to external third party cellular towers 310. The cell towers 310 pass the signal through satellites 320 to a remote location 330. Due to the use of external third party systems, the probability of a system failure increases. Since the condition monitoring system 100 is not easily accessible, it cannot be reset easily if a malfunction occurs, which necessitates the use of the features discussed in relation to FIG. 1 to ensure system stability in the field.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A condition monitoring sensor system, the system comprising:
   a power supply;
   a condition monitoring sensor;
   a processor;
   a permanently powered power-on timer set for a first predetermined duration configured to wake the processor by connecting the processor to the power supply if the power-on timer elapses; wherein the processor is configured to, upon waking up,
   reset the power-on timer to the first predetermined duration,
   set a watchdog timer powered via the power supply for a second predetermined duration, and
   control at least the condition monitoring sensor to take condition monitoring data;
   wherein the watchdog timer forces the processor and the watchdog timer to enter sleep mode by disconnecting the processor and the watchdog timer from the power supply if the watchdog timer elapses.

2. The condition monitoring sensor system of claim 1, further comprising: a permanently powered real time clock configured to wake the processor by connecting the processor to the power supply based on a predetermined schedule.

3. The condition monitoring sensor system of claim 1, wherein the processor is configured to update or reset the processor's configuration if the power-on timer wakes the processor.

4. The condition monitoring system of claim 1, wherein the watchdog timer, while powered, is configured to override other circuit components when disconnecting the processor from the power supply.

5. The condition monitoring sensor system of claim 2, further comprising
   a switch coupled between the power supply and the processor,
   wherein during the processor's sleep mode the switch is controlled by the real time clock or the power-on timer to enter the processor's wake mode, and
   wherein during the processor's wake mode the switch is controlled by the processor or the watchdog timer to enter the processor's sleep mode.

6. The condition monitoring sensor system of claim 5, wherein the switch comprises a field effect transistor, FET.

7. The condition monitoring sensor system of claim 1, further comprising one or more antennas; and
   transceiver circuitry coupled to the one or more antennas and configured to transmit condition monitoring data from the condition monitoring sensor to a remote device.

8. A method for monitoring a condition of a system, comprising:
   setting an independently powered power-on timer for a first predetermined duration;
   waking a processor from sleep mode if the power-on timer has elapsed;
   resetting the power-on timer to the first predetermined duration when the processor wakes;
   setting a watchdog timer for a second predetermined duration when the processor wakes;
   taking or transmitting condition monitoring data when the processor is in wake mode; and
   forcing the processor and watchdog timer into sleep mode if the watchdog timer elapses.

9. The method of claim 8, further comprising:
   waking the processor from sleep mode based on a predetermined schedule.

10. The method of claim 8, further comprising:
    updating or resetting the configuration of the processor if the power-on timer wakes the processor.

* * * * *